Nov. 23, 1954                J. SEVERANCE                2,694,967
                            ROW CROP CULTIVATOR

Filed March 26, 1949                                3 Sheets-Sheet 1

INVENTOR.
Joe Severance
BY
Atty.

INVENTOR.
Joe Severance

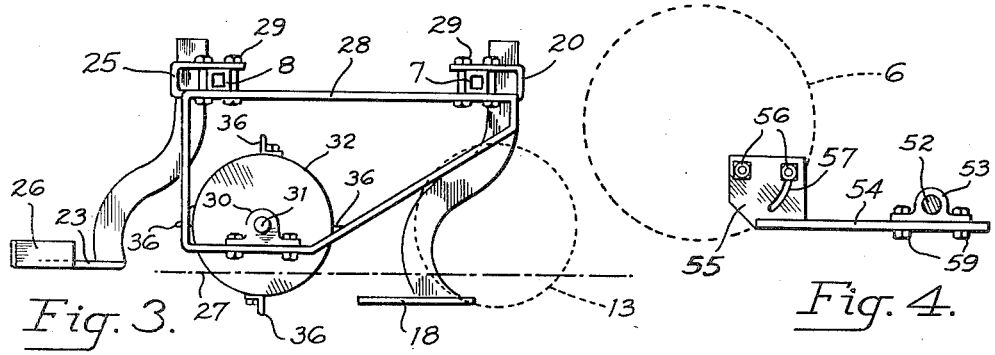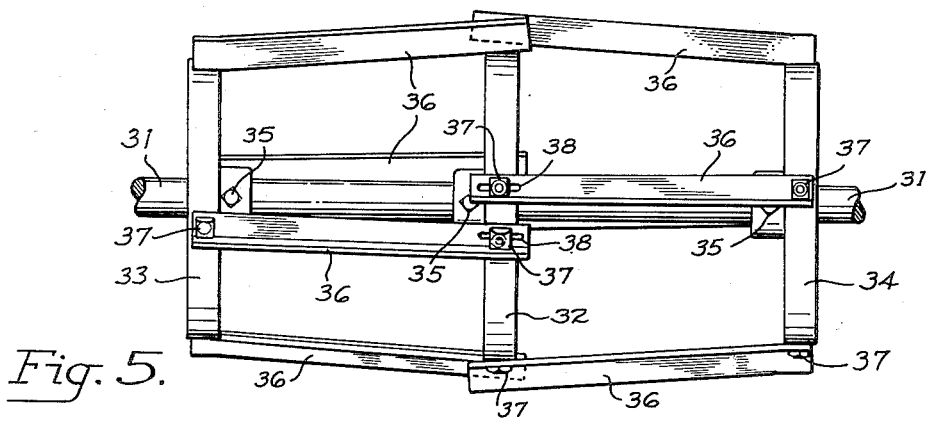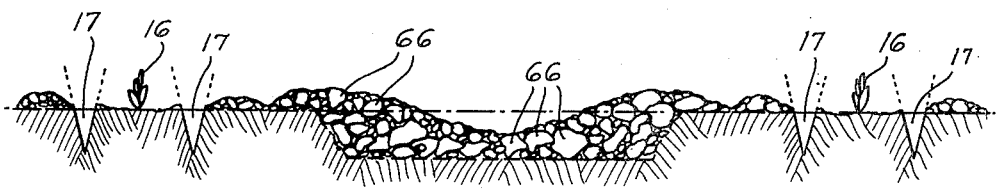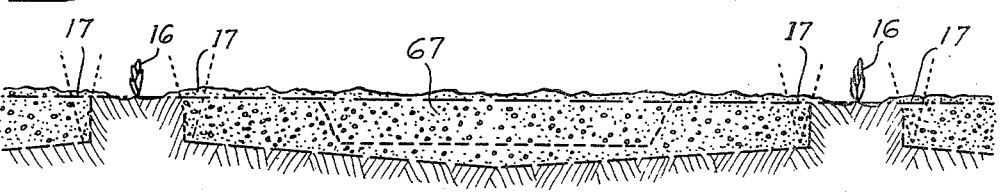

United States Patent Office 2,694,967
Patented Nov. 23, 1954

2,694,967

ROW CROP CULTIVATOR

Joe Severance, Grangeville, Idaho, assignor of one-half to Robert C. Chattin, Boise, Idaho Application March 26, 1949, Serial No. 83,579

1 Claim. (Cl. 97—35)

My invention pertains to cultivators, and relates particularly to a novel combination of ground working implements for use especially in cultivating and conditioning the soil for the proper growth of row planted crops. This application is a continuation-in-part of my copending application Serial No. 786,031, filed November 14, 1947, now United States Patent Number 2,669,173, issued February 16, 1954, and entitled Cultivator Attachment.

It has been the general practice heretofore to cultivate row crops in either one of two ways. One of these methods is to run a hiller between the rows and thereby move the soil closer to the plant while simultaneously forming an irrigation trough longitudinally between the rows. This method is deficient in that the soil immediately adjacent the plants is not treated, and it is necessary therefore to hoe the hills by hand in order that weeds may be removed and the soil loosened. Moreover, the hilling method produces large lumps of soil in great quantity. These lumps become dehydrated rapidly upon exposure to the atmosphere and hardened into dry aggregates which are not easily disintegrated thereafter. Thus, the moisture so necessary for proper growth of the crop is lost and the efficiency of the soil for propagation of the plant is reduced materially.

The second method of cultivating row crops comprises the cutting away of soil adjacent the planted row by means of disc plows and loosening a portion of the soil between the rows with such devices, for example, as duck foot cultivator elements. This type of cultivator cannot be of such effective width as would loosen all of the soil between rows because some of the soil would necessarily be pushed onto the plants. The soil is then corrugated to provide means for irrigation. A serious objection to this method of cultivation resides in the fact that the row plants now project from a narrow ridge of soil defined by the marginal furrows produced by the disc plows. This narrow strip of soil is most readily dehydrated because it is exposed to the atmosphere and, unless such cultivation is followed closely by irrigation, the soil becomes hard and dry with consequent reduction in its utility.

It is a principal object of my invention, therefore, to provide a cultivator by which the soil surrounding row planted crops may be tilled for eradication of weeds without incurring objectionable dehydration.

Another important object is the provision of a row crop cultivator which produces a mulch of the soil between planted rows, said mulch extending closely adjacent the planted crop and forming a substantially level area between said rows.

A further object of my invention is to provide a novel combination of ground working implements including a rotary mulching unit by which the above recited objects are achieved.

A further object is the provision of a row crop cultivator including a rotary mulching unit, which cultivator may be readily attached to conventional types of power driven tractors.

A still further object is to provide, in combination with a row crop cultivator attachment for tractors including a rotary mulching unit, novel coupling means by which power from said tractor is utilized to drive said rotary mulching unit.

These and other objects and advantages of my invention will appear from the following detailed description taken in connection with the accompanying drawings, in which:

Fig. 3 is a side elevation taken along the line 3—3 in Fig. 2, showing the construction and arrangement of ground working implements embodying my invention, the arrangement of a disc plow being indicated in dotted outline;

Fig. 4 is a side elevation taken along the line 4—4 in Fig. 2, showing the construction of adjustable mounting means for the drive coupling embodying features of my invention;

Fig. 5 is a fragmentary plan view showing the construction of a rotary mulching element embodying my invention;

Fig. 6 is a vertical cross section of ground showing the results of treatment with the forward row of ground working tools illustrated in Figs. 1 and 2; and Fig. 7 is a view similar to Fig. 6, showing the results of treatment with the entire combination of ground working tools embodying the cultivator of my invention.

Figure 1:
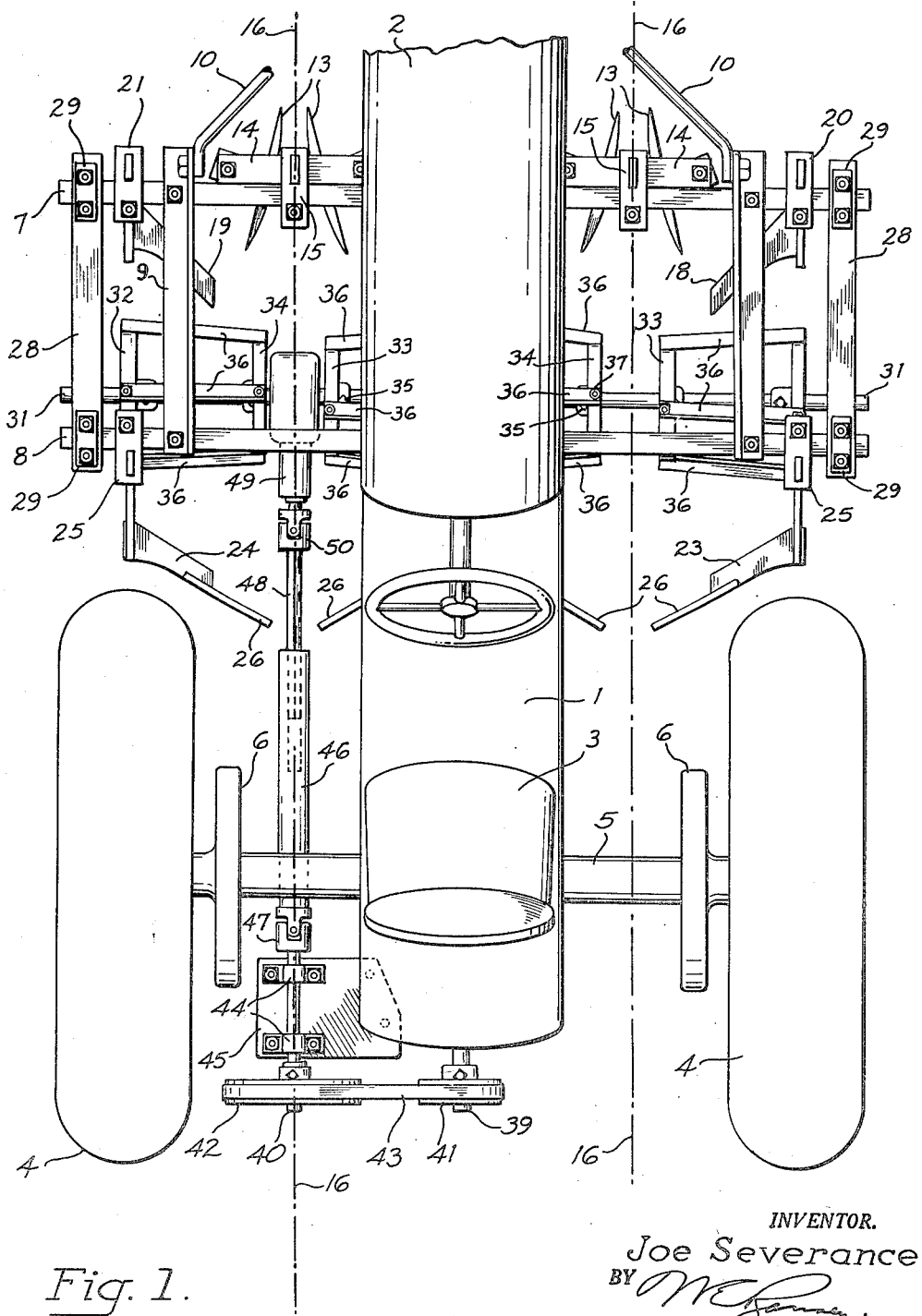
Fig. 1 is a fragmentary plan view of a power tractor having mounted thereon a row crop cultivator attachment embodying the features of my invention, and illustrating one form of means by which power from said tractor may be coupled to the rotary mulching unit in accordance with my invention.
Figure 2:
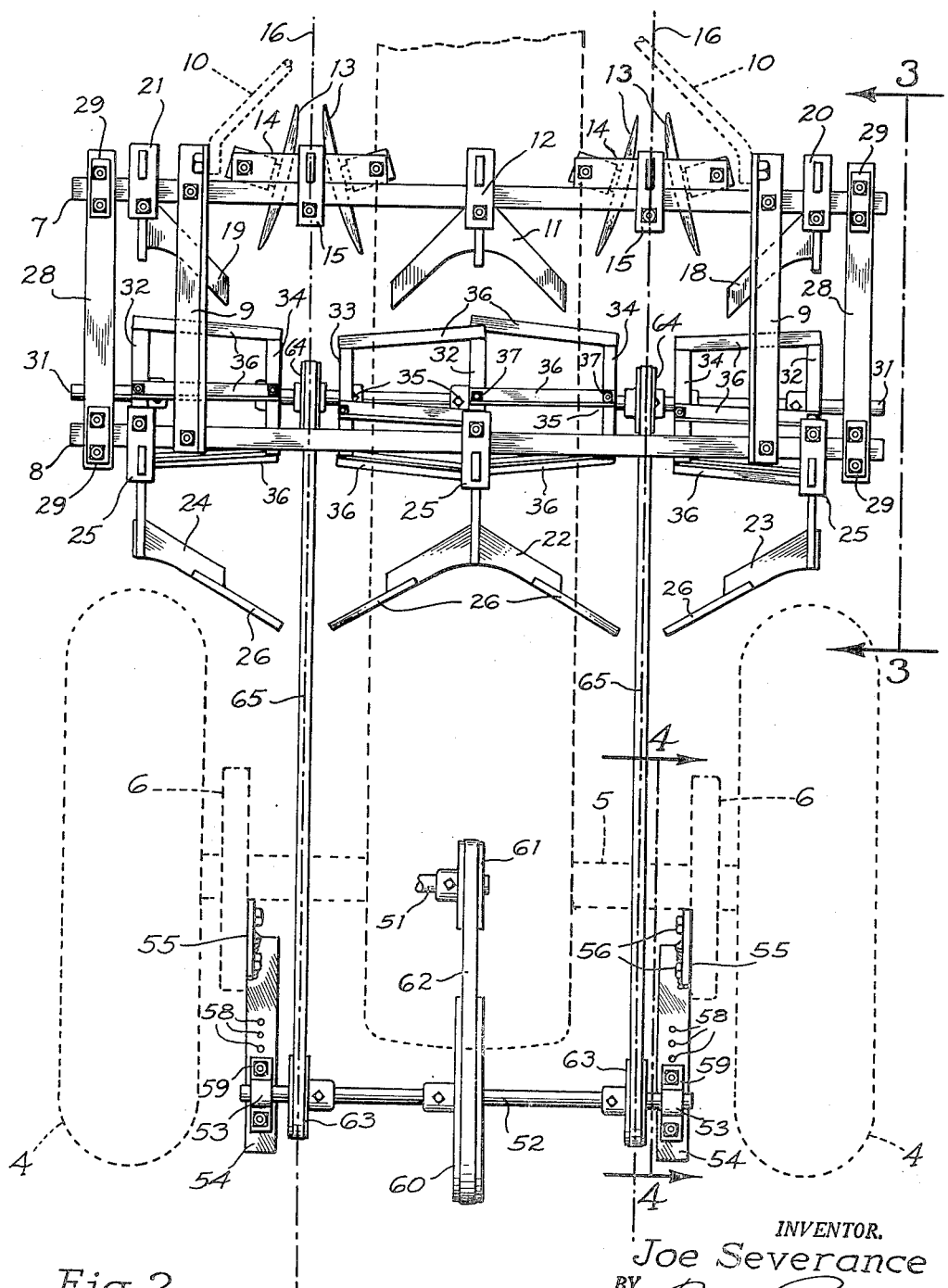
Fig. 2 is a fragmentary plan view of another type of power tractor having mounted thereon the cultivator attachment shown in Fig. 1, and illustrating a second form of means by which power from said tractor may be coupled to the rotary mulching unit, according to my invention.

The cultivator attachment embodying my invention is adapted to be secured to the frame structure of conventional types of power driven tractors such as are illustrated partially in Figs. 1 and 2 of the drawings. A central longitudinal frame member 1 supports the drive motor 2 and seat 3 thereon. The frame member is in turn supported on spaced front dirigible wheels (not shown) and rear drive wheels 4. The latter wheels are spaced transversely of the central frame and are connected by a drive axle 5 which engages the individual power gears of each wheel contained in the housings 6. Other types of tractors may be used with the cultivator attachment embodying my invention, the form of tractor shown in the drawings being intended merely as a convenience in illustrating the manner in which the attachment is mounted.

A pair of conventional tool bars 7 and 8 are arranged transversely of the tractor under the frame member 1 or upon a tool holder fixed to the rear thereof and in a laterally stable position. The tool bars are held firmly in spaced lateral relation with each other by means of brackets 9 secured therebetween adjacent the ends of the former. The forward ends of brackets 9 are joined pivotally to the rearward ends of link rods 10. Said link rods converge forwardly and are mounted pivotally to the front end (not shown) of the frame member 1. Lever means (not shown) interconnects the rearward end of the tool bar assembly with the frame in such manner as to permit raising and lowering of said assembly vertically with respect to the ground, in conventional manner.

Depending centrally from the forward tool bar 7 is a conventional duck foot cultivator element 11. Said duck foot is mounted detachably on the tool bar by means of a clamp 12 which accommodates vertical adjustment of the duck foot with respect to the ground. Pairs of disc plow blades 13 are mounted on opposite ends of brackets 14 secured slidably on clamps 15. Said clamps are mounted on the tool bar 7 at opposite sides of the central duck foot 11. The spacing between said pairs of discs corresponds to the distance between rows 16 of plants being cultivated. Each pair of discs 13 are spaced apart adjustably in order that each disc may lie closely adjacent opposite sides of the plants forming said rows. The discs forming each pair converge in a forwardly direction and thus produce V-shaped troughs 17 on opposite sides of the planted rows when the cultivator is drawn through the soil, as shown in Fig. 6 of the drawings.

Additional half duck foot elements 18 and 19 are mounted on tool bar 7 by means of clamps 20 and 21, respectively, in manner similar to element 11. As shown clearly in Figs. 1 and 2, said duck foot elements 18 and 19 extend inwardly toward the pairs of discs 13 at substantially the same spacing and angle of the central duck foot 11. While I have shown but two pairs of discs 13 arranged on the tool bar 7, it is to be understood that a longer tool bar may be used and additional discs and full duck foot elements 11 mounted thereon in the proper spaced relation described hereinbefore. In this manner, as many rows of plants may be cultivated as desired, depending upon the number of ground working implements provided.

The tool bar 8 disposed rearwardly of tool bar 7 is provided with additional duck foot elements 22, 23, and 24 which are similar in shape to and are arranged in longitudinal alinement with the forward duck foot elements 11, 18 and 19, respectively. These elements are mounted detachably on tool bar 8 by means of clamps 25 which, like the clamps used on the forward tool bar 7, accommodate vertical adjustment of the ground working tools. Mounted vertically on the trailing edges of the duck foot elements 22, 23 and 24 and forming lateral extensions thereof are scraping blades 26. Referring to Fig. 3 of the drawings, it is to be noted that the ground working tools mounted on the forward tool bar 7 are adjusted vertically to a position at which they penetrate the soil to a depth of a few inches, while the duck foot elements mounted on the rear tool bar 8 are adjusted to a position substantially level with the surface 27 of the ground. The function of the rear duck foot elements is to level the soil and to push a small quantity of the latter more closely adjacent the rows of plants by means of the plates 26, as discussed more fully hereinafter.

A pair of brackets 28 are secured detachably between the tool bars 7 and 8 adjacent the ends of the latter by means of bolt clamps 29. The brackets are substantially trapezoidal in profile, the shorter horizontal side being arranged below the longer parallel side, as shown in Fig. 3. Bearings 30 are mounted on the lower horizontal sides of said brackets and support rotatably therein the rotor shaft 31 which extends transversely of the tractor parallel with the longitudinal dimensions of the tool bars 7 and 8. Secured to the rotor shaft are mulching rotors of the type now to be described.

The mulching rotor arranged centrally on the rotor shaft 31 comprises a central hub disc 32 and end hub discs 33 and 34 spaced laterally on opposite sides of the center disc. Each disc is secured detachably and independently to the rotor shaft by such means as the set screws 35. The central disc 32 is preferably of slightly larger diameter than the end hubs, although such construction is not essential to proper operation of the device. Mulching blades 36 conveniently formed of lengths of angle iron are secured detachably and pivotally between the central disc 32 and the opposite end discs by means of bolts 37 to form a substantially cage-like rotor. Elongated slots 38 are provided in the ends of the blades secured to the center hub 32 to provide a degree of adjustment whereby the length of the rotor may be altered to accommodate various widths between rows 16. Since each of the hub discs may be rotated on the shaft 31 independently of the others by loosening the proper set screw 35, the angularity of the blades 36 with respect to the axis of rotation of shaft 31 may be altered at will to produce various degrees of shearing action by the blades on the soil being cultivated.

Additional rotors are arranged on the shaft 31 at opposite sides of the central rotor. These flaking rotors, as shown in Figs. 1 and 2 of the drawings, are about one-half the length of the center rotor, being made up of parts which comprise the latter. Thus, the right hand rotor is made up of a central hub disc 32 and one end disc, such as 33, with mulching blades 36 secured therebetween as on the center rotor. Similarly, the left hand rotor comprises a central hub 32 and one end disc, such as 34, with mulching blades 36 secured therebetween. In this manner, the rotors illustrated may be built up from one set of standard parts. If it is desired to provide more ground working tools in order to cultivate a greater number of crop rows in one operation, a longer tool bar 8 and rotor shaft 31 may be installed, and duplicate tools mounted thereon as explained hereinbefore in connection with tool bar 7. In such a case, a plurality of mulching rotors similar to the central rotor illustrated are mounted in properly spaced relation on the shaft 31, with the smaller rotors mounted at opposite ends of the shaft.

Means by which power derived from the tractor is coupled to the rotor shaft 31 is dependent upon the type of tractor employed. For example, the tractor illustrated in Fig. 1 of the drawings is equipped with a power take-off shaft 39 extending rearwardly from the differential drive gears of the axle 5. With this construction, I couple the power take-off shaft 39 to a jack shaft 40 by means of pulleys 41 and 42 and belt 43. The jack shaft is mounted for rotation in bearings 44 secured to a bracket plate 45 projecting laterally from the frame member 1. The forward end of the jack shaft is joined to a tube 46 through a universal 47. The central hole in said tube, as shown, is of square cross section, although other non-circular shapes may be used with equal facility. A square shaft 48, slidably received within the squared tube 46, extends from the latter forwardly toward the gear assembly 49 which engages the rotor shaft 31. Said gear assembly and the squared shaft are joined articulately through universal 50.

The tractor illustrated in dotted outline in Fig. 2 is provided with an auxiliary power shaft 51 located generally just below the driver's seat. In coupling the power from shaft 51 to rotor shaft 31, I mount a jack shaft 52 transversely of the tractor in bearings 53 secured to brackets 54. Said brackets extend forwardly to the gear housings 6 and are secured thereto by means of plates 55 which form an integral part of the brackets. Each of said plates is secured to the gear housing by means of bolts 56, one of which extends through an arcuate slot 57 formed in the plate to provide vertical adjustment of the jack shaft 52. Longitudinal adjustment of the jack shaft with respect to the power shaft 51 is provided by a series of holes 58 formed in the brackets 54. The bearings 53 may thus be secured to the brackets by means of bolts 59 extending through any pair of holes 58 selected. A pulley 60 is secured to the jack shaft 52 and is interconnected to a pulley 61 on the power shaft 51 by means of belt 62. Pulleys 63 secured to the jack shaft at opposite sides of pulley 60 interconnect pulleys 64 secured to the rotor shaft 31 through belts 65.

Although the cultivator is used most frequently for conditioning soil in which row crops have already been planted, it has been found desirable in many instances to operate the cultivator immediately ahead of the planting machine. It is not infrequent that considerable time elapses between the preparation of the soil for planting and the actual planting of the crop. The two most prevalent causes of such condition are, first, the impending danger of a frost and, second, the occurrence of rain. In both cases, planting time may of necessity be postponed for days, during which time a new crop of weeds has had opportunity to germinate and, frequently, to grow up from the freshly prepared soil. It is essential for maximum crop production that weeds which have germinated or grown be killed before the crop is planted, for otherwise the crop growth is inhibited by the earlier start of weeds. The use of the cultivator ahead of the planting machine not only effects destruction of germinated and grown weeds, but also reconditions the soil which may have become packed as a result of prior rains.

In operation, the cultivator attachment embodying my invention is transported in elevated position under or behind the tractor to the field where cultivation is to be performed. The pairs of discs 13 are adjusted to proper spacing upon the forward tool bar 7, i. e. the spacing between pairs is adjusted to equal the width between rows of plants already planted, or about to be planted. The duck foot elements flanking said discs, as well as those arranged on the rear tool bar 8, are then secured in proper symmetrical position. It is to be noted that all of the ground work implements mounted upon the forward tool bar are arranged to penetrate the soil to a depth of a few inches, it being evident to those skilled in the art that variations in depth may be made to accommodate diverse conditions of soil and desired treatments.

Similarly, the overall length of each mulching rotor mounted on the rotor shaft 31 is adjusted, as described hereinbefore, in accordance with the width between rows. Referring to Figs. 1 and 2 of the drawings, it is noted that the ends of the various mulching rotors adjacent the rows 16 terminate in substantially longitudinal alinement with one of the discs 13. Additionally, if desired, the mulching blades 36 may be set at oblique angles with respect to the axis of rotation of shaft 31, as explained before. The speed with which the mulching rotors are revolved is determined by the condition of the soil being treated, the degree of pulverization desired and the depth to which said rotors are to penetrate. As shown in Fig. 3, the depth setting of the mulching rotors is slightly greater than that of the forward ground working tools.

Having thus arranged the ground working implements in proper operating position, the tractor is propelled forwardly and the tool bar assembly is lowered by means of the lever system described hereinbefore to bring the tools into proper relationship with the soil. Assuming, for purposes of illustration, that a row crop has previously been planted, the pairs of discs 13 are arranged to straddle each row 16 with discs of each pair penetrating the soil adjacent opposite lateral sides of the plants. As the tractor moves forwardly, each disc cuts a V-shaped trough 17 on opposite sides of the planted rows, throwing the soil outwardly away from the plants.

The duck foot plow elements 11, 18 and 19 enter the soil slightly rearwardly of the discs 13 and break up a major portion of the soil lying intermediate the rows of plants into substantially large aggregate or lumps 66, as shown in Fig. 6 of the drawings. In the event that the duck foot elements should loosen extremely large portions of soil extending toward the rows of plants, the V-shaped troughs 17 serve to break the soil so loosened and thus prevent uprooting of the planted crop or other damage to the row soil. The forward duck foot tools have thus loosened and partially disintegrated a major portion of the soil between the rows, leaving but a minor portion of packed soil to be treated by the rotary mulching units. In cases where the ground has been worked just prior to treatment with mulching units, the soil may be sufficiently loose to obviate the necessity of further treatment with the forward tool assembly, for it is the primary function of these elements to loosen a major portion of the soil and thereby reduce the power requirements of the mulching rotors.

As the rapidly rotating mulching blades 36 cut through the ground, the soil is broken into finely divided particles. These particles of soil are lifted and thrown rearwardly of the rotors with substantially none of the soil being deposited more closely to the plants than are the lateral edges of the blades 36. The rearward bank of duck foot tools 22, 23 and 24 with their attached scraping blades 26 thereafter move over the surface of the mulch 67 laterally and draw a portion of the latter toward the rows of plants. This small portion of soil is deposited about the base of the plants, as shown in Fig. 7, thereby covering over and killing any weeds which have germinated or begun to grow in the plant rows. This latter operation greatly reduces the time, and hand labor otherwise expended, in keeping the rows free from weeds.

It is to be noted, in Fig. 7 of the drawings, that the bed of mulch 67 extends laterally between rows 16 sufficiently to fill the V-shaped troughs 17 previously formed by the discs 13. The mulch does not tend to give up moisture, as contrasted with the clods or lumps 66. On the contrary, it has been found that the mulch tends to draw moisture upwardly from the underlying soil. In many instances, this action has been found to be a sufficient substitute for irrigation, thereby further reducing the costs of producing the crop. The mulch bed may thereafter be corrugated or formed into lateral ditches for irrigation purposes without incurring the usual production of clods or lumps which, as explained hereinbefore, become dry and hard upon exposure to the atmosphere.

The method of cultivation described hereinbefore forms the subject matter of the claim of my copending application Serial No. 83,580, entitled Method of Cultivating Row Crops and filed concurrently herewith, which application matured in United States patent numbered 2,669,067, issuing February 16, 1954.

I claim:

A row crop cultivator attachment for tractors comprising a pair of longitudinally spaced tool bars mounted below said tractor and extending transversely thereof, pairs of groove-forming elements mounted on the forward tool bar, each of said pairs being positioned to enter the soil closely adjacent opposite sides of the planting area of each row and to move said soil outwardly away from the said planting area, an elongated, transversely disposed, subsurface slicing blade mounted on the forward tool bar substantially spanning the distance intermediate said pairs of groove forming elements, rotary power driven mulching units which are laterally disposed between rows and having blades lying in the periphery thereof and extending generally normal to said periphery, said mulching units being mounted for rotation about an axis parallel to and intermediate said tool bars, the ends of said mulching units being in substantially longitudinal alinement with the groove-forming elements disposed forwardly thereof, thereby spanning the distance between rows, and scraping elements mounted on the rearward tool bar in longitudinal alinement with said mulching units, said scraping elements being positioned to move a portion of the soil treated by said mulching units toward the rows, thereby to cover said planting area with a layer of mulch to inhibit growth of weeds therein.

References Cited in the file of this patent

UNITED STATES PATENTS

| Number | Name | Date |
|---|---|---|
| 429,668 | Whitman | June 10, 1890 |
| 432,286 | Shepherd | July 15, 1890 |
| 1,310,583 | Smith | July 22, 1919 |
| 1,364,720 | Cook | Jan. 4, 1921 |
| 1,473,519 | Rolli | Nov. 6, 1923 |
| 1,544,632 | Branson | July 7, 1925 |
| 2,071,118 | Graham | Feb. 16, 1937 |
| 2,232,523 | Gray | Feb. 18, 1941 |
| 2,244,538 | Kasten | June 3, 1941 |
| 2,317,188 | Hanson | Apr. 20, 1943 |
| 2,361,798 | Smith | Oct. 31, 1944 |
| 2,502,468 | Marihart | Apr. 4, 1950 |